March 11, 1969 F. SCHNEIDER 3,431,874
STOPPING MECHANISM FOR SEWING MACHINES
Filed July 17, 1967
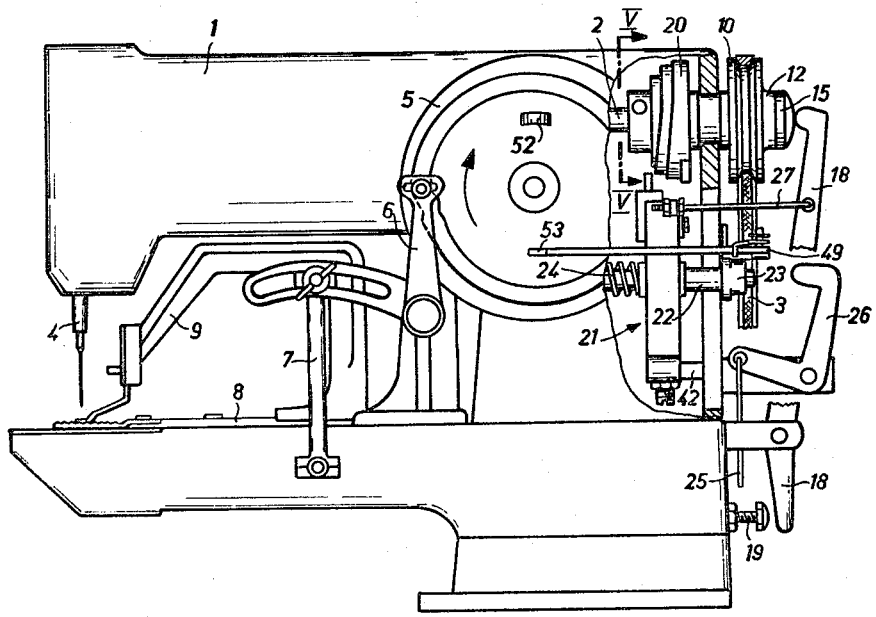
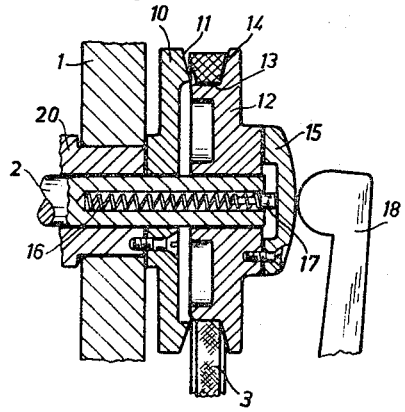 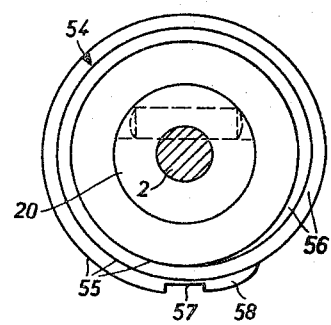
INVENTOR.
FRANZ SCHNEIDER
BY
AGT.

March 11, 1969   F. SCHNEIDER   3,431,874
STOPPING MECHANISM FOR SEWING MACHINES
Filed July 17, 1967

INVENTOR.
FRANZ SCHNEIDER
BY
Robert H. Jacob
AGT.

United States Patent Office 3,431,874
Patented Mar. 11, 1969

---

3,431,874
STOPPING MECHANISM FOR SEWING MACHINES
Franz Schneider, Kaiserslautern, Germany, assignor to G. M. Pfaff AG., Kaiserslautern, Pfalz, Germany
Filed July 17, 1967, Ser. No. 653,821
Claims priority, application Germany, July 23, 1966, P 40,034
U.S. Cl. 112—219     2 Claims
Int. Cl. D05b 69/00; F16p 3/00; F16d 67/00

---

ABSTRACT OF THE DISCLOSURE

A stopping mechanism for a swing machine where a cam having an axial and radial track and a stopping device having a brake member with cooperating axial and radial brake surfaces are adapted to guide the braking operation in relation to a programming device.

---

Summary of the invention

The present invention relates to stopping means for sewing machines. More in particular, the invention relates to a stopping mechanism for sewing machines of the type in which the main shaft is driven by a drive belt that can be connected and disconnected. The stopping mechanism has a shut off or cut out element which is manually or automatically releasable for engaging with its braking surface the braking track of a braking element mounted on the main shaft and ultimately to engage a stopping groove at the end of the braking track.

Objects of the invention

In accordance with the invention a stopping mechanism is to be created that is particularly simple and economically advantageous, which achieves that the braking time is distributed over more than one rotation. The problem in this connection was to attain with a particular shape of the brake element in combination with a particularly designed construction of the stopping element, to extend the braking action over more than one rotation of the main shaft.

This problem is solved in accordance with the invention in that the braking path or track runs at least over a part of its length laterally of the shut off groove or slot, and a guiding means that is in driving connection with the main shaft effects displacement of the stopping member during the braking operation from the lateral part of the braking path into the path of the stopping slot. In this manner the long braking path which ordinarily requires expensive gearing and deviations can be obtained by a braking element which is secured directly to the main shaft.

In accordance with a further modification of the invention a particularly simple solution of the problem is obtained in that the braking path or track provided upon the braking element consists of a radial and an axial braking surface, while the radial braking surface increases from a radius which is smaller than the distance of the braking surface of the braking element from the axis of rotation of the braking element, to a radius of greater distance and simultaneously provides for the guidance of the stopping member during the braking action.

Brief description of the drawings

Further advantageous features and objects of the invention will become apparent from the embodiment of the new stopping mechanism described in connection with a sewing machine, which sews groups of stitches, as illustrated in the accompanying drawings, in which,
FIG. 1 is a front view of the machine, partly in section;
FIG. 2 is a section taken through the end of the main shaft which carries the belt pulley;
FIG. 5 is a section taken along lines V—V in FIG. 1.

Description of the invention

Figure 3:
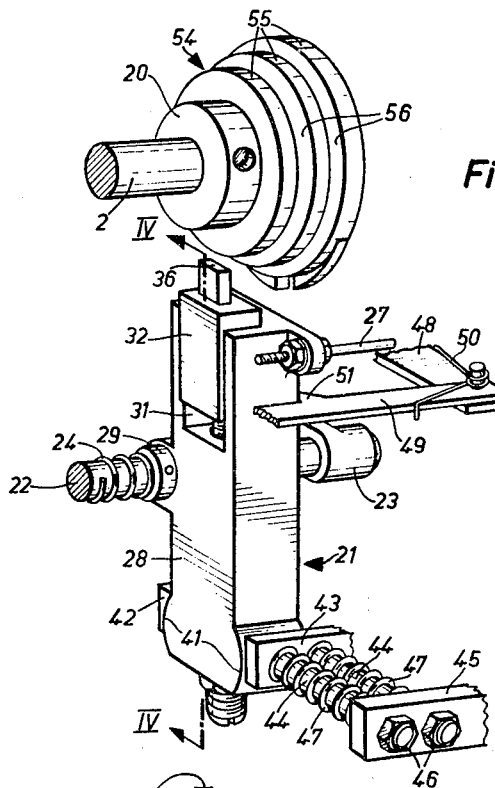
FIG. 3 is a perspective view of the stopping mechanism.

As shown in FIG. 1, the sewing machine has a housing 1 with a main shaft 2 which is driven in a known manner by way of a cone or V-belt 3 and transmits the driving force to a needle bar 4 and a cam disk 5. The feeding of the material to be sewn is controlled or guided in a known manner by the cam disk 5 by way of transmission members 6, 7, 8 and 9.

A belt pulley member 10 (FIG. 2) having a surface 11 that engages the cone or V-belt 3 is secured to the end of the main shaft 2 which extends from the housing 1. A loose and axially displaceable second belt pulley member 12 journalled on the main shaft 2 cooperates with the belt pulley member 10. This second member has two surfaces 13 and 14 which are in engagement with the wedge belt 3 and define the bottom and one side of a generally V-shaped groove, the other side of which is defined by the surface 11.

A cap 15 is secured to the belt disk element 12. A spring 16 accommodated in the hollow end of the main shaft 2 which biases a bolt 11 against the cap 15 pushes the belt pulley member 12 which is connected with the cap 15 away from the belt pulley member 10 that is secured to the main shaft 2.

The displacement of the belt pulley member 12 against the belt pulley member 10 is effected by a lever 18 (FIG. 1). The latter is pivotally mounted on the housing 1 of the sewing machine. Its deflection is limited by an abutment screw 19.

Inside the housing 1 a brake element 20 is secured to the main shaft 2 with which shut off or stopping device 21 cooperates which is fastened to a shaft 22 that extends parallel to the main shaft 2. The shaft 22 is displaceably journalled in bearings 23 which are secured in the housing. A spring 24 biases the shut off or stopping device 21 together with shaft 22 to the right actuating means including an angular lever 26 pivotally supported on the housing 1 which is movable by means of a bar 25 is operative to press the shaft 22 with the stopping device 21 to the left.

Lever 18 is connected to the stopping device by way of a spacing bar 27 the length of which is adjustable. The shut off or stopping device 21 (FIGS. 3 and 4) comprises a support 28 which is rockably or pivotably mounted on the shaft 22. Two limiting rings 29 fastened to the shaft 22 secure the support 28 against axial displacement on the shaft 22.

The support 28 is provided with a bore 30 extending longitudinally thereof, which merges with a guide slot 31 in the upper end of the support 28. A brake member 32 is supported in the guide slot 31 for displacement longitudinally of the support 28. The brake member 32 is retained by a stud screw 33 which passes through a slot 34 in a side wall 35 of the guide slot 31.

Figure 4:
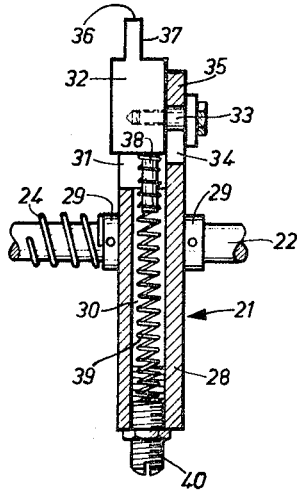
FIG. 4 is a section taken along line IV—IV in FIG. 3.

The brake member 32 is provided with braking surfaces 36 and 37 at its end facing the brake element 20 (FIG. 4). Braking surface 37 extends in a generally radial direction relative to the axis of said brake element 20 and surface 36 extends generally at right angles to surface 37. The other end of the brake member supports a stud 38 which extends into bore 30 and which supports one end of a spring 39, the other end of which is supported against a screw 40 that closes the bore 30. The pressure of the spring 38 can be adjusted by means of screw 40.

The lower part of the support member 28 is provided with two bulged portions 41 which are disposed between an angular member 42 that is adjustably mounted on the machine housing 1 and a plate 43.

The plate 43 supports two bolts 44 which are guided in an angular support member 45 secured to the housing 1, and the movement of which is limited by nuts 46. Springs 47 arranged upon bolts 44 press the plate 43 against the support 28. A supporting arm 48 which has a latch 49 fastened thereto is secured to the housing 1. A torsion spring 50 biases the latch 49 against the stopping device 21 so that a stopping lug 51 on the latch 49 can be located against the stopping device 21.

A release means for releasing the latch 49 includes the cam disk 5 which is provided with a cam 52 (FIG. 1). This cam engages an extension arm 53 of the latch 49 when the cam disk 5 is suitably positioned.

The brake element 20 (FIGS. 3 and 5) presents a brake track 54 cooperates with the brake member 32. This brake track 54 is defined by two braking surfaces 55 and 56. The braking surface 55 is formed in a manner that it starts with a radius which is smaller than the distance of the brake surface 36 of the brake member 32 from the axis of rotation of the main shaft 2 when the stopping member 21 is in position of rest. The distance of the braking surface 55 then increases with respect to the axis of rotation of shaft 2 and simultaneously moves with the braking surface 56 from the left to the right until at its end it is interrupted by a stopping slot or recess 57 which is adjacent to an abutment 58.

The brake track 54 thus defines a volute spiral which in the embodiment shown evolves continually in its radial direction from the axis of rotation of the brake element 20 as well as also in axial direction. However, it would also be possible to form the brake track 54 of partial sections of the braking surfaces 55 and 56 which extend alternately constant, i.e., at an equal distance from the axis of rotation or from a plane of rotation, and continually variable with respect to the axis of rotation or to this plane of rotation. Furthermore, it would be possible to obtain the lateral guidance of the shut off or stopping device 21 during the braking operation not by the special formation of the brake track 54 but by a special element controlled by the main shaft 2.

The stopping mechanism operates as follows: Upon starting the drive means (not shown) the V-belt 3 which is running on the bottom surface 13 merely drives the loose belt pulley member 12. The starting of the sewing machine is effected by pressing down a foot pedal (not shown) which is connected to the bar 25. As this happens the shaft 22 with the stopping member 21 is displaced towards the left by the angular lever 26 against the pressure of spring 24, as shown in FIG. 1. When the stopping device 21 reaches its end position on the left, the stopping lug 51 of the latch 49 drops in behind the support 28 and thus retains the stopping device 21 in this position. At the same time the lever 18 is also swung to the left by means of the spacing bar 27 and displaces the belt pulley element 12 against the belt pulley element 10 while overcoming the bias of the spring 16. The V-belt 3 is now clamped between the surfaces 11 and 14, and due to the friction between it and surface 11, it drives the belt pulley element 10 and thus the main shaft 2.

The machine starts and sews a predetermined sequence of stitches in a known manner. At the same time the material being sewn is moved relative to the path of movement of the needle bar 4 in accordance with the sewing program or pattern disposed on a programming device such as the cam disk 5 in a manner corresponding to the predetermined stitch sequence.

At the end of the sequence of stitches the release means becomes operative; the cam 52 contacts the extension arm 53 of the latch 49 and rocks the same counterclockwise, as illustrated in FIG. 3, about its pivot point on the support member 48 until its stopping lug 51 releases the stopping device 21. The latter is displaced to the right under the effect of spring 24 and simultaneously moves the lever 18 by way of spacing bar 27 from the cap 15. As a result the spring 16 can also displace the belt pulley element 12 to the right, the V-belt 3 disengages the surface 11 and now only drives the belt pulley member 12, which runs freely on the main shaft 2 by way of the bottom surface 13.

The stopping device 21 moves so far to the right that the braking surface 37 of the brake member 32 comes into engagement with the braking surface 56 of the brake element 20. At this moment the braking operation starts as a result of the friction arising from the relative movement between the brake surfaces 37 and 56, while the friction still increases after engagement of the braking surface 36 with the braking surface 55.

As the braking surface 36 engages the braking surface 55 the braking member 32 is pushed into the guide slot 31 due to the outwardly moving braking surface 55, and in this manner the braking pressure of spring 39 is increased. Thus the machine is braked by means of a braking force that increases during the braking operation.

At the end of the braking surface 55 the brake member 32 drops into the stopping slot or groove 57 and thus engages the abutment 58. The machine then stops in this position.

The momentum which still remains is absorbed by the springs 47 which are pressed together as the brake member 32 drops into the stopping groove or slot 57 due to the rocking movement of the stopping device 21 about the shaft 22. The plate 43 then presses the stopping device 21 under pressure of the springs 47 back against the angular member 42, which thereby determines the angular position of the braking member or element 20 in its stopping position and thus also the stopping position of the needle bar 4. Any displacement of the brake member 32 beyond the edges of the brake element 20 is prevented by the engagement of the lever 18 with the abutment screw 19, since it is connected with the stopping device 21 by way of the spacing bar 27.

Having now described my invention with reference to the embodiment illustrated in the drawings, I do not wish to be limited thereto, but what I desire to protect by Letters Patent of the United States is set forth in the appended claims.

I claim:

1. In a sewing machine of the type having a main shaft driven by a drive belt and coupling means mounted endwise of said main shaft and operative to couple and uncouple said belt and said main shaft, a stopping mechanism including a brake element mounted on said main shaft for rotation therewith, said brake element presenting a braking track extending over an angle of rotation in excess of 360° and having a stopping slot endwise of said track and a starting portion of said track extending laterally of said stopping slot, a stopping device mounted for axial movement on a shaft disposed parallel to said main shaft, and having a brake member adapted to engage said braking track and slot, actuating means operative to axially move and maintain said stopping device out of engagement with said brake element and simultaneously engage said coupling means, and release means including a programming device driven by said main shaft and having a member operative in a predetermined position to engage said actuating means and permit movement of said stopping device into engagement with said brake element and uncouple said coupling means.

2. A stopping mechanism as set forth in claim 1, where said brake member presents a lateral radially extending braking surface and an axial braking surface disposed generally rectangularly thereto and said braking track of said brake element comprises an axial and a radial braking surface, said axial braking surface of said braking track varying from a radial distance from the axis of rotation of said brake element which is smaller than the radial distance of the axial braking surface of said brake member from said axis of rotation to a greater radial distance and said radial braking surface of said braking track being simultaneously displaced in lateral direction.

References Cited

UNITED STATES PATENTS

| | | | |
|---|---|---|---|
| 1,085,093 | 1/1914 | Schoenky | 112—219 |
| 1,843,534 | 2/1932 | Allen | 112—219 |
| 2,338,611 | 1/1944 | Wood | 112—219 X |
| 2,604,062 | 7/1952 | Rich. | |
| 2,721,526 | 10/1955 | Ivanko | 112—219 X |
| 2,969,755 | 1/1961 | Reece | 112—219 X |

CARLTON R. CROYLE, *Primary Examiner.*

A. D. HERRMANN, *Assistant Examiner.*

U.S. Cl. X.R.

192—139, 149, 10; 188—70